Oct. 7, 1969  J. E. FUCHS  3,471,014

APPARATUS FOR RECLAIMING SOLIDS

Filed Oct. 30, 1967

INVENTOR.
JOSEPH E. FUCHS
BY
Charles L. Lovercheck

United States Patent Office 3,471,014
Patented Oct. 7, 1969

3,471,014
APPARATUS FOR RECLAIMING SOLIDS
Joseph E. Fuchs, 3023 Feasler Ave., Erie, Pa. 16506
Filed Oct. 30, 1967, Ser. No. 678,931
Int. Cl. B03b 3/52
U.S. Cl. 209—155                   1 Claim

ABSTRACT OF THE DISCLOSURE

A solids separator has a rotatable drum disposed at an angle of approximately 30 degrees to the horizontal. A jet of water is directed into the drum at an angle of 15 to 30 degrees laterally to the central axis of the drum and 5 degrees downward from said axis. The drum has paddles with openings through them. The paddles are attached to the inside of the drum slightly more than halfway between the bottom and the top of the drum. These paddles are curved on a slightly smaller radius of curvature than the radius of the drum. There may be approximately three or more of these paddles. An inclined trough introduces the solids to be separated into the drum.

---

It is an object of the invention to provide an improved separating machine.

Another object of the invention is to provide a separating machine that is simple in construction, economical to manufacture, and simple and efficient to use.

Another object of the invention is to provide a separating machine in the form of a rotatable open drum having spaced paddles fixed to its inside periphery that are curved about a radius slightly smaller than the radius of said drum. The paddles have spaced openings in them through which the material being separated can flow.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
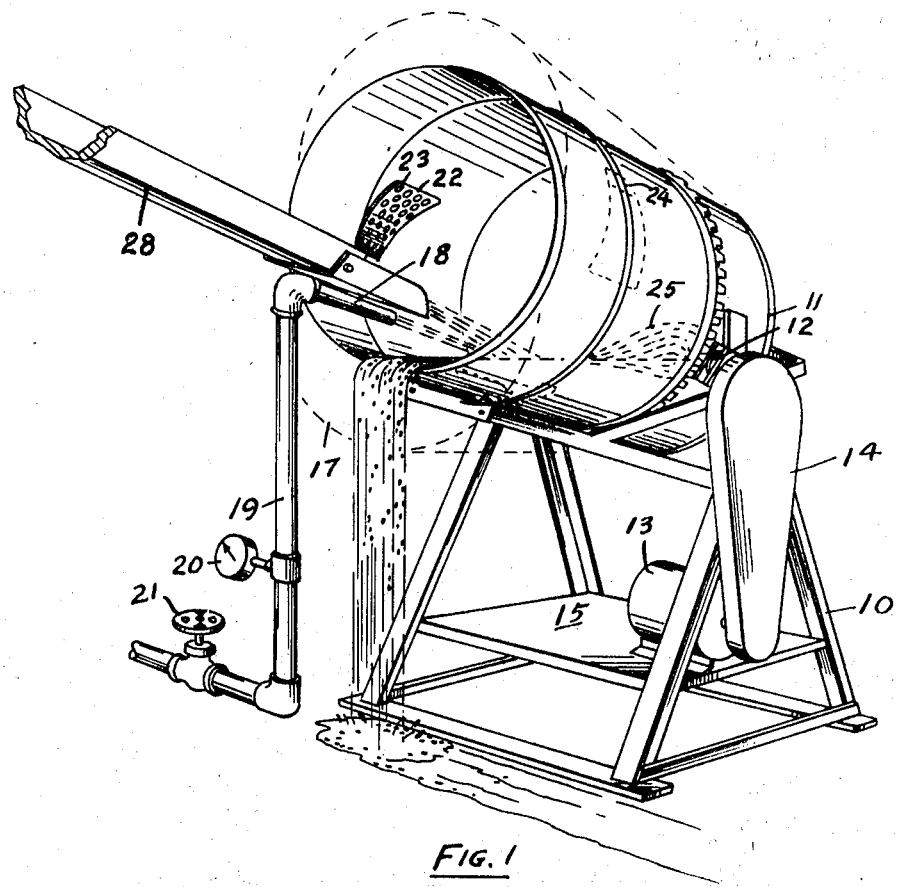
FIG. 1 is an isometric view of the separating machine according to the invention.
Figure 2:
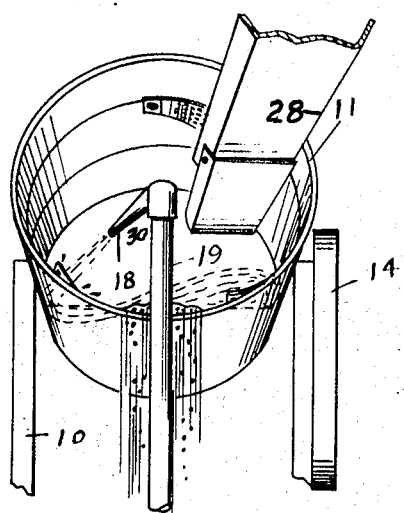
FIG. 2 is a front view of the machine shown in FIG. 1.

Now with more particular reference to the drawing, in the machine shown a frame 10 is adapted to rest on the ground and it has a drum 11 supported on trunnions 12 which are driven through a motor 13 and a belt indicated inside the guard 14. The motor rests on the platform 15.

The drum is generally cylindrical in shape and it may be moved upward to the upper dotted line position 16 or downward to the lower emptying position 17 also shown in dotted lines. In operation, the central axis of the drum is disposed about a vertical angle of approximately 5 degrees to the nozzle 18 and at a lateral angle of approximately 30 degrees to the central axis of the nozzle. The nozzle 18 is supplied with water through a pipe 19 which has a suitable gauge 20 on it for measuring pressure and the control valve 21 may be operated to shut the water on and off in a conventional manner.

The paddles 22 are curved about a radius approximately half the radius of the drum. That is, a radius of six inches for a drum 24 inches in diameter has been found satisfactory. For a drum this size, the paddles will be 4 inches wide at its outer end and set in 9 inches from the end of the drum. These paddles are generally wedge shaped and have holes 23 which may be from ½ inch to one inch in diameter and spaced approximately one inch apart. There are four rows of the holes as shown extending around the circumference of the drum and seven rows of holes in the opposite direction in each paddle. The paddles are set in from the end of the drum a distance equal to slightly half the radius of said drum. The paddles are attached to the inside of the drum by suitable means, such as welding, at 24 and they may be attached so that the end that is attached toward the direction of rotation of the drum so that material in the drum will flow through the holes and thereby agitate it further and lend to the mixing action. The nozzle 18 is so directed that the water inside the drum will follow a modified spiral path shown at 25 in the drawing and thence flow out of the upper end of the mixer. The path will be inward, then up, toward the center of the drum and downward. Material may be fed to the drum by chute 28. Chute 28 is a trough-like chute inclined generally parallel to nozzle 18.

It has been discovered that when the paddles with holes as set forth are used, in most instances, it is not necessary to use water as from the nozzle 18.

The foregoing specification sets forth the invention in its preferred practical forms but the structure shown is capable of modification within a range of equivalents without departing from the invention which, it is to be understood, is broadly novel as is commensurate with the appended claim.

The embodiments of the invention in which an exclusive property or privilege is claimed are defined as follows:

1. A machine for separating solids having different specific gravities comprising
   a generally cylindrical drum open at its upper end,
   means to support said drum on said machine with its central axis inclined to the vertical,
   curved paddles fixed to the inside surface of said drum at positions between the center thereof and the said open end thereof,
   said paddles having a plurality of spaced openings therein whereby liquid and solids in said drum may flow therethrough,
   and means to rotate said drum about its said central axis,
   said paddles being wedge shaped and curved about a radius of curvature approximately half the radius of said drum,
   means being provided on said machine to direct a stream of water into said drum at a lateral angle of approximately 30 degrees to the central axis of said drum and at a vertical angle of approximately five degrees to said central axis, inclined chute means for introducing said solids into the drum,
   said holes being between one half and one inch in diameter and spaced approximately one inch apart,
   approximately four rows of said holes being provided in each said paddle,
   said rows extending generally parallel to the circumference of said drum,
   said paddles being set in from the end of the drum a distance equal to slightly half the radius of said drum.

References Cited
UNITED STATES PATENTS

| | | | |
|---|---|---|---|
| 471,041 | 3/1892 | Veronee | 209—452 X |
| 551,201 | 12/1895 | Collins | 209—452 X |
| 655,494 | 8/1900 | Lissau | 209—482 |
| 1,357,884 | 11/1920 | McFarland | 209—482 X |
| 1,606,322 | 11/1926 | Scrive | 259—89 |
| 1,824,688 | 9/1931 | Rigler | 209—452 |
| 2,119,414 | 5/1938 | Blanchard | 209—452 |
| 3,001,338 | 9/1961 | Parker | 51—164 |
| 3,291,304 | 12/1966 | Fuchs | 209—155 |

FRANK W. LUTTER, Primary Examiner

U.S. Cl. X.R.

134—153; 209—452, 482; 259—3